(12) United States Patent
Arita et al.

(10) Patent No.: US 6,477,850 B2
(45) Date of Patent: Nov. 12, 2002

(54) AIR CONDITIONER

(75) Inventors: Kazuhei Arita, Shizuoka (JP);
Tomiyuki Matsukiyo, Shizuoka (JP);
Yoshihiro Ichino, Shizuoka (JP); Shinji Tongu, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/917,895

(22) Filed: Jul. 31, 2001

(65) Prior Publication Data
US 2002/0023442 A1 Feb. 28, 2002

(30) Foreign Application Priority Data
Jul. 31, 2000 (JP) .......................................... 2000-231692

(51) Int. Cl.[7] .............................................. F25B 15/00
(52) U.S. Cl. .............................. 62/148; 62/141; 62/239; 62/243; 62/476
(58) Field of Search ........................ 62/148, 141, 239, 62/243, 476

(56) References Cited
U.S. PATENT DOCUMENTS

| | | |
|---|---|---|
| 4,523,631 A | 6/1985 | McKinney |
| 4,589,262 A | 5/1986 | Nagao |
| 5,275,010 A * | 1/1994 | Hisajima et al. ............... 62/148 |
| 5,289,868 A * | 3/1994 | Koseki et al. ................. 165/14 |
| 5,363,668 A | 11/1994 | Nakao et al. |
| 5,682,760 A * | 11/1997 | Hollingsworth .............. 62/4.97 |
| 5,761,925 A * | 6/1998 | Maeda ........................ 62/476 |
| 6,055,821 A * | 5/2000 | Song et al. .................... 62/195 |

* cited by examiner

Primary Examiner—William C. Doerrler
Assistant Examiner—Mark Shulman
(74) Attorney, Agent, or Firm—Sughrue Mion, PLLC

(57) ABSTRACT

The air conditioner comprises heat transfer medium temperature adjusting device 1 for adjusting the temperature of a heat transfer medium, an absorption chiller 5 having as a heat source the heat transfer medium supplied from the heat transfer medium temperature adjusting device 1 via a heat transfer medium line 7a through which the heat transfer medium conducts, a valve 9a provided in the heat transfer medium line 7a, a by-pass line 11a branching off from the valve 9a, and an indoor unit 19 supplied with a refrigerant from the absorption chiller 5 or the heat transfer medium from the heat transfer medium temperature adjusting device 1 via the by-pass line 11a. Thereby, at the time of heating, the valve is switched to allow the heat transfer medium to pass through the by-pass line 11, so that the heat transfer medium can be directly supplied via the by-pass line 11 to the indoor unit 19. Hence, in the heating operation, the devices such as pumps involving the operation of the absorption chiller 5 can be stopped, so that the air conditioner can be improved in the energy saving.

11 Claims, 2 Drawing Sheets

AIR CONDITIONER

BACKGROUND OF INVENTION

1. Field of Invention

The present invention relates to an air conditioner comprising an absorption chiller, and more particularly to an air conditioner comprising an absorption chiller of heat transfer medium drive type.

2. Related Art

In the air conditioner comprising the absorption chiller of heat transfer medium drive type that is driven by a heat transfer medium for driving which is heated, the cooling is performed by supplying a refrigerant cooled by activation of the absorption chiller to an indoor unit. On one hand, at the time of heating, the absorption chiller is driven by the use of exhaust heat source such as a hot water (entering a heat source from outside) to heat the heat transfer medium for heating that is supplied to the indoor unit, or a heat exchanger for heating, provided separately from the absorption chiller, is employed to heat the heat transfer medium for heating that is supplied to the indoor unit owing to heating of the heat transfer medium for driving.

Generally, there is a demand for improving the energy saving of the air conditioner. For this demand, the present inventors have contemplated that the energy saving of the air conditioner can be improved by utilizing effectively the heat energy of heat transfer medium in a heating operation of the air conditioner, and further suppressing the consumption of energy associated with the activation of the heat exchanger for heating or the absorption chiller. That is, the present inventors have contemplated that a heat transfer medium obtained from an exhaust heat source is supplied directly to the indoor unit to perform heating, whereby it is unnecessary to provide the heat exchanger for heating, and the activation of the absorption chiller or the units involving the operation of the absorption chiller is stopped when heating, whereby the energy consumption associated with the activation of the heat exchanger for heating or the absorption chiller is suppressed to improve the energy saving.

However, in the case where the heat transfer medium that is heated is supplied directly to the indoor unit, if the blow-off temperature of hot air from the indoor unit gets too high at the time of heating, due to the temperatures of the heat transfer medium, the temperature distribution in the room is difficult to become uniform, resulting in poor amenity in some cases. Also, if the temperature of heat transfer medium exceeds the heat resisting temperatures of the indoor unit or the control valve, there are some instances that the operation of the air conditioner may be hindered. Therefore, it is required that the temperature of heat transfer medium falls below the heat resisting temperatures of the system of units, and further the temperature is adjusted so that the temperature distribution within the room is likely to be uniform. On the other hand, when a refrigerant supplied to the indoor unit is cooled by the absorption chiller at the time of cooling, there are some instance that the absorption chiller can be never or less efficiently driven at the temperatures required for the time of heating. Accordingly, it is required that the temperature of heat transfer medium supplied to the absorption chiller at the time of cooling may be higher than at the time of heating. In this way, because the temperatures of heat transfer medium are different depending on whether the cooling or heating, there is the problem with the conventional air conditioner comprising the absorption chiller of heat transfer medium drive type that simply changing the pipes may result in the poor amenity within the room, the impeded operation of the air conditioner, or the lower cooling or heating efficiency, depending on the temperature of heat transfer medium, when heating.

SUMMARY OF INVENTION

It is an object of the present invention to improve the energy saving of an air conditioner.

An air conditioner of the present invention comprises heat transfer medium temperature adjusting means for adjusting the temperature of a heat transfer medium, an absorption chiller having as a heat source the heat transfer medium supplied from the heat transfer medium temperature adjusting means via a heat transfer medium line through which the heat transfer medium passes, a valve provided in the heat transfer medium line, a by-pass line branching off from the valve, and an indoor unit supplied with a refrigerant from the absorption chiller or the heat transfer medium from the heat transfer medium temperature adjusting means via the by-pass line.

Further, the heat transfer medium temperature adjusting means stops the heating of heat transfer medium at the highest temperature in a first temperature range, and starts the heating of heat transfer medium at the lowest temperature in the first temperature range, when the heat transfer medium passes through the absorption chiller, or stops the heating of heat transfer medium at the highest temperature in a second temperature range that is lower than the first temperature range, and starts the heating of heat transfer medium at the lowest temperature in the second temperature range when the heat transfer medium passes through the by-pass line.

Also, the heat transfer medium temperature adjusting means comprises an exhaust heat recovery unit for recovering an exhaust heat from an exhaust heat source into the heat transfer medium, a temperature sensor for sensing the temperature of heat transfer medium, and a control unit for controlling at least the exhaust heat recovery unit and the temperature sensor. Further, when the heat transfer medium passes through the absorption chiller, the control unit stops the exhaust heat recovery unit to recover the exhaust heat into the heat transfer medium, if the temperature sensor senses the highest temperature in a first temperature range, and starts the exhaust heat recovery unit to recover the exhaust heat into the heat transfer medium, if the temperature sensor senses the lowest temperature in the first temperature range, or when the heat transfer medium passes through the by-pass line, the control unit stops the exhaust heat recovery unit to recover the exhaust heat into the heat transfer medium, if the temperature sensor senses the highest temperature in a second temperature range that is lower than the first temperature range, and starts the exhaust heat recovery unit to recover the exhaust heat into the heat transfer medium, if the temperature sensor senses the lowest temperature in the second temperature range.

With such a constitution, at the time of heating, the valve is switched to allow the heat transfer medium to pass through the by-pass line, so that the heat transfer medium is supplied from the heat transfer medium temperature adjusting means via the by-pass line to the indoor unit. Hence, the heating operation can be performed by directly supplying the heat transfer medium to the indoor unit. In other words, in the heating operation, the activation of the absorption chiller or the devices involving the operation of the absorption chiller can be stopped, thereby reducing the consumption of energy used in the operation of the air conditioner.

And the heat transfer medium temperature adjusting means can adjust the temperature of heat transfer medium to be higher when the heat transfer medium passes through the absorption chiller than when the heat transfer medium passes through the by-pass line. That is, since the temperature of heat transfer medium is controlled to be higher at the time of cooling than at the time of heating, it is unlikely that the poor amenity within the room at the time of heating, the impeded operation of the air conditioner, or the lower cooling or heating efficiency may occur. Accordingly, the air conditioner can be improved in the energy saving.

By the way, there are some instances that the temperature of exhaust heat from the exhaust heat source is too low to enable the heat transfer medium to effect the cooling or heating operation at full efficiency. In such instances, the conventional air conditioner stops the heat exchange from the exhaust heat source into the heat transfer source, and employs an auxiliary heater to heat the transfer medium. However, in this conventional air conditioner, the energy saving can not be fully attained because the heat from the exhaust heat source can not be effectively utilized.

On the other hand, an air conditioner of the invention comprises heat transfer medium temperature adjusting means having an auxiliary heater and a control unit for controlling the operation of this auxiliary heater. Further, when the heat transfer medium passes through the absorption chiller, the control unit stops the auxiliary heater to heat the heat transfer medium, if the temperature sensor senses the highest temperature in a third temperature range that is lower than the highest temperature in the first temperature range, and starts the auxiliary heater to heat the heat transfer medium at the lowest temperature in the third temperature range, if the temperature sensor senses the lowest temperature in the first temperature range, or when the heat transfer medium passes through the by-pass line, the control unit stops the auxiliary heater to heat the heat transfer medium, if the temperature sensor senses the highest temperature in a fourth temperature range that is lower than the highest temperature in the second temperature range, and starts the auxiliary heater to heat the heat transfer medium, if the temperature sensor senses the lowest temperature in the fourth temperature range.

With such a constitution, the auxiliary heater heats the heat transfer medium in a state where the exhaust heat from the exhaust heat source is recovered into the heat transfer medium, and stops the heating of heat transfer medium at a temperature below the temperature range of the exhaust heat recovery that is started or stopped. Therefore, the heat transfer medium recovers the exhaust heat except when the abnormally high temperature condition occurs to stop the exhaust heat recovery, and the auxiliary heater heats the heat transfer medium to supplement for insufficient heat with the exhaust heat recovery. Accordingly, in the case of employing the auxiliary heater, the exhaust heat obtained from the exhaust heat source can be effectively utilized by suppressing the energy consumption of the auxiliary heater as much as possible, whereby the energy saving of the air conditioner can be improved.

Also, if the temperature sensor and the control unit are employed to detect overheating of heat transfer medium, one temperature sensor can be utilized for both the control of the temperature of heat transfer medium and the detection of abnormal overheat, whereby there is the advantage that the number of temperature sensors can be reduced.

DETAILED DESCRIPTION OF PREFERRED EMBODIMENTS

Figure 1:
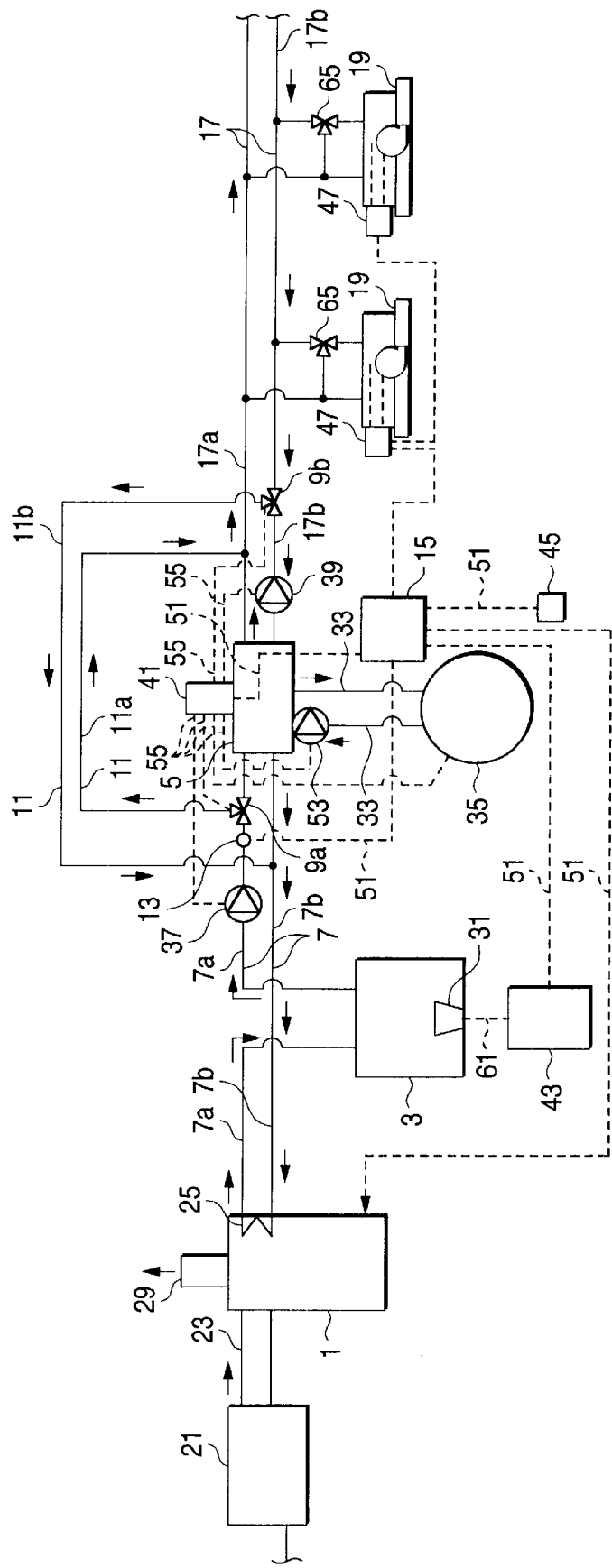
FIG. 1 is a diagram showing a schematic configuration and the operation of an air conditioner in one embodiment of the present invention.
Figure 2:
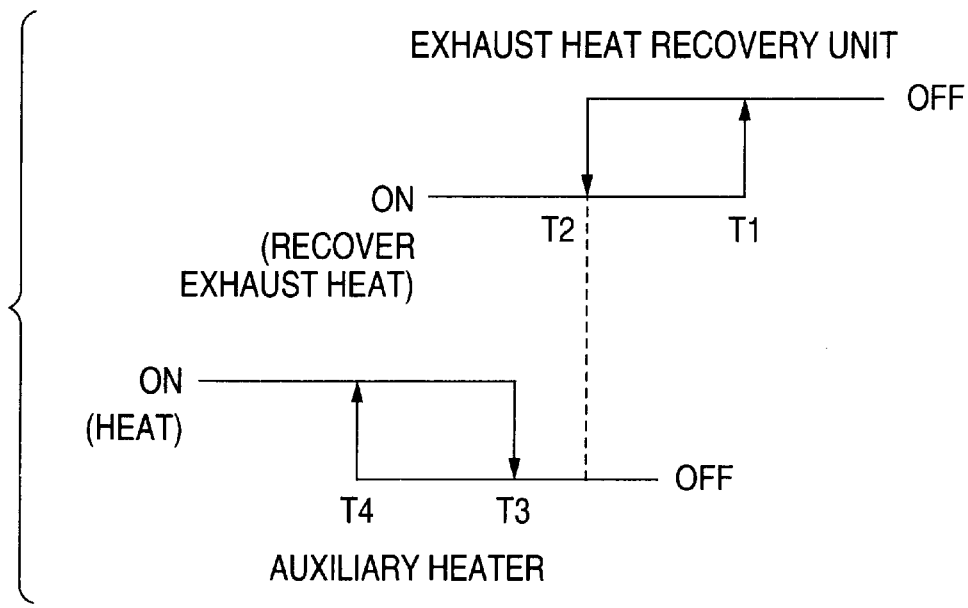
FIG. 2 is a diagram showing the operation of an exhaust heat recovery unit and an auxiliary heater when cooling.
Figure 3:
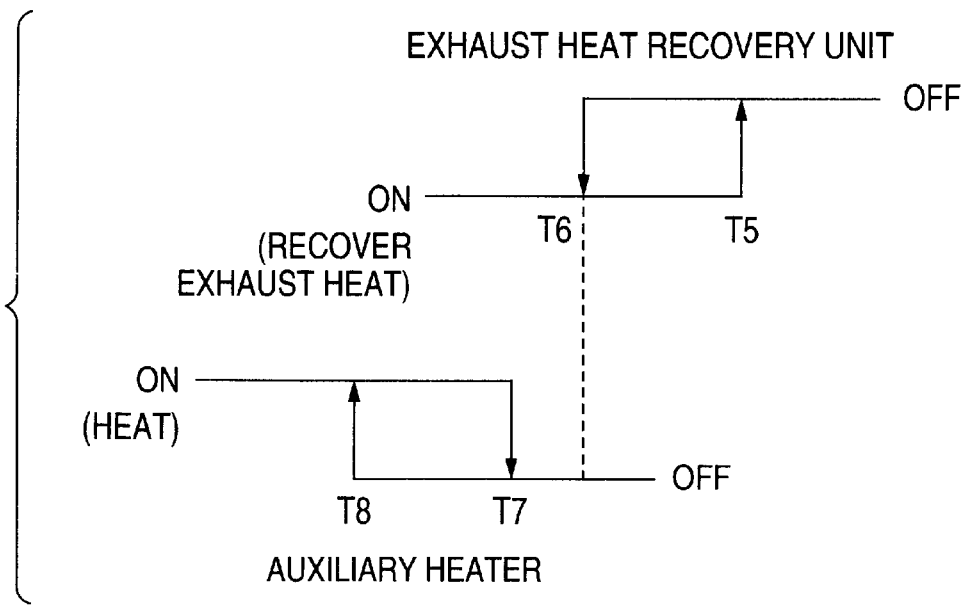
FIG. 3 is a diagram showing the operation of the exhaust heat recovery unit and the auxiliary heater when heating.

One embodiment of an air conditioner to which the present invention is applied will be described below with reference to FIGS. 1 to 3. FIG. 1 is a diagram showing a schematic constitution and the operation of the air conditioner according to the invention. FIG. 2 is a diagram showing the operation of an exhaust heat recovery unit and an auxiliary heater when cooling. FIG. 3 is a diagram showing the operation of the exhaust heat recovery unit and the auxiliary heater when heating. This embodiment will be described below in connection with an instance in which an engine is an exhaust heat source, and the heat transfer medium is heated by this exhaust heat.

The air conditioner of this embodiment comprises an exhaust heat recovery unit 1, an auxiliary boiler 3, an absorption chiller 5, a heat transfer medium line 9, three way valves 9a, 9b, a by-pass line 11, a heat transfer medium temperature sensor 13, a control unit 15, a chilled and hot water line 17, and an indoor unit 19, as shown in FIG. 1. The exhaust heat recovery unit 1 recovers a heat of exhaust gas supplied via the exhaust gas line 23 from the engine that is an exhaust heat source into the water that is the heat transfer medium conducting through the heat transfer medium line 7 with a heat exchanger 25. The exhaust heat recovery unit 1 is internally equipped with a flow passage switching mechanism, not shown, for switching the flow passage through which the exhaust gas flows. This flow passage switching mechanism switches the flow of exhaust gas in a direction toward an exhaust air line 29 or a heat exchanger direction 25, excess exhaust heat being discharged through the exhaust air line 29. The auxiliary boiler 3 is provided with a heat transfer medium line 7a through which heat transfer medium conducts from the exhaust heat recovery unit 1 to the absorption chiller 5. The auxiliary boiler 3 is equipped with a burner 31 to heat the heat transfer medium by burning.

The absorption chiller 5 is the heat transfer medium drive type having a regenerator for heating a lean solution with the heat of heat transfer medium. The absorption chiller 5 is equipped with a cooling tower 35 for cooling the cooling water circulating through a cooling water line 33. The heat transfer medium line 7 consists of a heat transfer medium line 7a for conducting the heat transfer medium from the exhaust heat recovery unit 1 via the auxiliary boiler 3 to the absorption chiller 5, and a heat transfer medium line 7b for conducting the heat transfer medium from the absorption chiller 5 to the exhaust heat recovery unit 1, the heat transfer medium line 7a having a heat transfer medium pump 37 to circulate the heat transfer medium between the exhaust heat recovery unit 1 and the absorption chiller 5, as previously described. The chilled and hot water line 17 consists of a chilled and hot water line 17a for conducting the chilled water that is the refrigerant from the absorption chiller 5 to the indoor unit 19, or the hot water that is the heat transfer medium from the by-pass line 11, and a chilled and hot water line 17 for conducting the chilled water or hot water from the indoor unit 19 to the absorption chiller 5, the chilled and hot water line 17b having a chilled water pump 39.

The by-pass line 11 consists of a by-pass line 11a for passing the heat transfer medium conducting through the heat transfer medium line 7a to the chilled and hot water line 17a and a by-pass line 11b for passing the heat transfer medium conducting through the chilled and hot water line 17b to the heat transfer medium line 7b. The by-pass line 11a branches from the heat transfer medium line 7a via a three way valve 9a provided between the auxiliary boiler 3 of the heat transfer medium line 7a and the absorption chiller 5 and joins into the heat transfer medium line 7b.

The control unit 15 is electrically connected via a wiring 51 to a power box 41, an auxiliary boiler control unit 43, a cooling or heating change-over switch 45, a flow passage switching mechanism of the exhaust heat recovery unit 1, an indoor unit control unit 47 for controlling the operation of the indoor unit 19, and the heat transfer medium temperature sensor 13 installed between the auxiliary boiler 3 of the heat transfer medium line 7 and the three way valve 9a. The power box 41 is electrically connected via a wiring 55 to a heat transfer medium pump 37 provided in the heat transfer medium line 7a, two three way valves 9a, 9b, a chilled water pump 39 provided in the chilled and hot water line 17b, a cooling fan, not shown, in the cooling tower 35, and a cooling water pump 53 provided in the cooling water line 33.

The control unit 15 has a malfunction detection feature, in which if the temperature of heat transfer medium sensed by the heat transfer medium temperature sensor 13 is a set malfunction detection temperature, a warning is issued to inform the user of a malfunction, and the burner 31 of the auxiliary boiler 3 is forcedly stopped to enable the flow passage switching mechanism to switch the exhaust heat recovery unit 1 to pass the exhaust gas to the exhaust air line 29 to expel the exhaust gas, and stop heating the heat transfer medium.

The auxiliary boiler control unit 43 is electrically connected via a wiring 61 to the burner 31 of the auxiliary boiler 3. In this embodiment, the control unit 15 issues an instruction signal, and the power box 41 switches the devices electrically connected to the power box 41 in accordance with this instruction signal. Also, in this embodiment, the control unit 15, the power box 41 and the auxiliary boiler control unit 43 are separately constructed, but may be made integrally as the control unit. An indoor unit control unit 47 controls the operation of a control valve 65 for controlling the switching of whether or not to conduct the hot water that is the chilled water or heated heat transfer medium into the indoor unit 19 in accordance with a signal from the control unit 15.

In the air conditioner as above constituted, if there is a demand for air conditioning, and the cooling operation is selected by an operation change-over switch 45, the control unit 15 controls the power box 41 to switch two three way valves 9a, 9b so that the heat transfer medium and the chilled water may circulate through the absorption chiller 5, the heat transfer medium line 11 and the chilled and hot water line 17. And the heat transfer medium pump 37 provided in the heat transfer medium line 7a, the chilled water pump 39 provided in the chilled and hot water line 17b, the cooling fan, not shown, of the cooling tower 35, and the cooling water pump 53 provided in the cooling water line 33 are activated. Thereby, the heat transfer medium conducting through the heat transfer medium line 11 recovers the exhaust heat from an engine 21 by means of the exhaust heat recovery unit 1. With a heat of heat transfer medium applied by the exhaust heat recovery unit 1, the absorption chiller 5 cools the water that is refrigerant conducting through the chilled and hot water line 17. The chilled water cooled by this absorption chiller 5 conducts into the indoor unit 19, so that a cold blast is delivered from the indoor unit 19.

In such cooling operation, in order that the absorption chiller 5 cools the water efficiently, and to prevent the temperature of heat transfer medium from dropping too excessively to drive the absorption chiller 5, the temperature of heat transfer medium must be maintained within a predetermined range. Therefore, the control unit 15 controls the flow passage switching mechanism of the exhaust heat recovery unit 1, and further the operation of the auxiliary boiler 3 via the auxiliary boiler control unit 43. When cooling, the control unit 15 controls the flow passage switch mechanism in a temperature range from T1 to T2, as shown in FIG. 2. Herein, it is supposed that T1 is higher than T2. That is, the control unit 15 controls the flow passage switching mechanism to be switched so that the exhaust gas from the engine 21 may flow into the exhaust air line 29, thereby flowing the exhaust gas into the exhaust air line 29, and stops the recovery of exhaust heat, if the temperature sensed by the heat transfer medium temperature sensor 13 reaches T1. In other words, the exhaust heat recovery by the exhaust heat recovery unit 1 is turned off. Thereby, the heating of heat transfer medium is stopped. If the heating of heat transfer medium is stopped, the temperature of heat transfer medium drops down, and the temperature sensed by the heat transfer medium temperature sensor 13 reaches T2, the control unit 15 controls the flow passage switch mechanism to be switched so that the exhaust gas from the engine 21 may be flowed into the heat exchanger 25, thereby flowing the exhaust gas into the heat exchanger 25, and starts the exhaust heat recovery. In other words, the exhaust heat recovery by the exhaust heat recovery unit 1 is turned on. Thereby, the heating of heat transfer medium is started.

At this time, if the temperature of exhaust gas from the engine 21 is so low that the heat transfer medium can not retain a sufficient temperature, and the temperature of heat transfer medium drops, the control unit 15 controls the auxiliary boiler control unit 43 to turn on or off the burner 31 of the auxiliary boiler 3 in a temperature range from T3 to T4. At this time, if the temperature sensed by the heat transfer medium temperature sensor 13 reaches T4, the burner 31 is turned on, and the heating of heat transfer medium is started. If the temperature of heat transfer medium rises owing to heating of heat transfer medium by the burner 31, and the temperature sensed by the heat transfer medium temperature sensor 13 reaches T3, the burner 31 is turned off, and the heating of heat transfer medium is stopped. At this time, if the temperature is T2 or below, the flow passage switch mechanism of the exhaust heat recovery unit 1 switches the exhaust gas from the engine 21 to flow into the heat exchanger 25, in which the exhaust heat recovery unit 1 effects the exhaust heat recovery from the engine 21 into the heat transfer medium. Accordingly, the auxiliary boiler 3 operates to supplement for insufficient quantity of heat to elevate the temperature of heat transfer medium above T3.

On the other hand, if there is a demand for air conditioning, and the heating operation is selected by the operation change-over switch 45, the control unit 15 controls the power box 41 to switch two three way valves 9a, 9b so that the heat transfer medium conducting through the heat transfer medium line 7 may flow through the by-pass line 11 into the chilled and hot water line 17. And the control unit 15 activates the heat transfer medium pump 37 alone provided in the heat transfer medium line 7b, and stops the chilled water pump 39 provided in the chilled and hot water line 17a, the cooling fan, not shown, of the cooling tower 35, and the cooling water pump 53 provided in the cooling water line 33. Thereby, the heat transfer medium is not supplied into the absorption chiller 5, and circulates via the by-pass line 11 between the exhaust heat recovery unit 1 and the indoor unit 19. The heat transfer medium conducts into the indoor unit 19, so that a hot air is blown off from the indoor unit 19.

In such heating operation, if the temperature of heat transfer medium is too high, the blow-off temperature from the indoor unit 19 becomes too high, resulting in the phenomenon that the temperature distribution within the room is difficult to be uniform, and the amenity may be worse. Also, there are some instances that the heat resisting temperature of the air conditioner 19 or the control valve 65 is exceeded, impeding the operation of the air conditioner. Therefore, the control unit 15 controls the flow passage switch mechanism of the exhaust heat recovery unit 1 and the operation of the auxiliary boiler 3 via the auxiliary boiler control unit 43. When heating, the control unit 15 controls the flow passage switch mechanism in a temperature range from T5 to T6, as shown in FIG. 3. At this time, it is supposed that T4 is higher than T5, and T5 is higher than T6.

That is, the control unit 15 controls the flow passage switching mechanism to be switched so that the exhaust gas from the engine 21 may flow into the exhaust air line 29, thereby flowing the exhaust gas from the engine 21 into the exhaust air line 29, and stops the recovery of exhaust heat, if the temperature sensed by the heat transfer medium temperature sensor 13 reaches T5. Thereby, the heating of heat transfer medium is stopped. If the heating of heat transfer medium is stopped, the temperature of heat transfer medium drops down, and the temperature sensed by the heat transfer medium temperature sensor 13 reaches T6, the control unit 15 controls the flow passage switch mechanism to be switched so that the exhaust gas from the engine 21 may be flowed into the heat exchanger 25, thereby flowing the exhaust gas into the heat exchanger 25, and starts the exhaust heat recovery. Thereby, the heating of heat transfer medium is started.

At this time, if the temperature of exhaust gas from the engine 21 is so low that the heat transfer medium can not retain a sufficient temperature, and the temperature of heat transfer medium drops, the control unit 15 controls the auxiliary boiler control unit 43 to turn on or off the burner 31 of the auxiliary boiler 3 in a temperature range from T7 to T8. At this time, it is supposed that T5 is higher than T7, and T6 is higher than T8. If the temperature of heat transfer medium drops and the temperature sensed by the heat transfer medium temperature sensor 13 reaches T8, the control unit 15 controls the burner 31 to be turned on, and the heating of heat transfer medium is started. If the temperature of heat transfer medium rises owing to heating of heat transfer medium by the burner 31, and the temperature sensed by the heat transfer medium temperature sensor 13 reaches T7, the burner 31 is turned off, and the heating of heat transfer medium is stopped.

At this time, if the temperature is T6 or below, the flow passage switch mechanism of the exhaust heat recovery unit 1 switches the exhaust gas from the engine 21 to flow into the heat exchanger 25 at any time, whereby the exhaust heat recovery unit 1 effects the exhaust heat recovery from the engine 21. Accordingly, when heating, the auxiliary boiler 3 also operates to supplement for insufficient quantity of heat to elevate the temperature of heat transfer medium above T8. In this way, the flow passage switch mechanism and the auxiliary boiler 3 are controlled in a lower temperature range when heating than when cooling. That is, heat transfer medium temperature adjusting means consisting of the exhaust heat recovery unit 1, the auxiliary boiler 3 and the control unit 15 adjusts the temperature of heat transfer medium to be higher when the heat transfer medium conducts into the absorption chiller 5 than when the heat transfer medium conducts into the by-pass line 11.

In this embodiment, the temperature range from T1 to T2 is controlled to be higher than the temperature range from T3 to T4, as shown in FIGS. 2 and 3, but if T1 is higher than T3 and T2 is higher than T4, the temperature range from T1 to T2 and the temperature range from T3 to T4 can be set such that the temperature range from T1 to T2 and the temperature range from T4 to T5 may overlap. Similarly, in this embodiment, the temperature range from T5 to T6 is controlled to be higher than the temperature range from T7 to T8, but if T5 is higher than T7 and T6 is higher than T8, the temperature range from T5 to T6 and the temperature range from T7 to T8 can be set such that the temperature range from T5 to T6 and the temperature range from T7 to T8 may overlap.

In this way, in the air conditioner of this embodiment, the heating operation can be performed by directly supplying the heat transfer medium to the indoor unit 19 by switching the three way valves 9a, 9b such that the heat transfer medium passes through the by-pass line 11 at the same time of heating. In other words, in the heating operation, the absorption chiller 5 or the devices involving the operation of the absorption chiller 5, for example, the chilled water pump 39 and the cooling pump 53, can be stopped. And the temperature of heat transfer medium is controlled by the heat transfer medium adjusting means, including the exhaust heat recovery unit 1, the heat transfer medium temperature sensor 13 and the control unit 15 so that the temperature of heat transfer medium at the time of cooling may be higher than that at the time of heating. Therefore, it is possible to avoid the lower amenity within the room when heating, the impeded operation of the air conditioner, or the lower cooling or heating efficiency that may result. Accordingly, the energy saving of the air conditioner can be improved.

Further, the air conditioner of this embodiment has an auxiliary boiler as the heat transfer medium temperature adjusting means. If the temperature of heat transfer medium is lower than a desired temperature, the burner 31 of the auxiliary boiler 3 is turned on or off in a state where the flow passage switching mechanism of the exhaust heat recovery unit 1 switches the exhaust gas from the engine 21 to flow into the heat exchanger 25, that is, a state where the exhaust heat recovery into the heat transfer medium occurs. Therefore, in order to set the heat transfer medium at a desired temperature, the auxiliary boiler 3 supplements for a quantity of heat that is short by the exhaust heat recovery alone, whereby the exhaust heat can be efficiently utilized, and the energy saving can be improved. However, in the case where the exhaust heat source has always sufficient quantity of heat, the auxiliary boiler 3 may not be provided. Also, in this embodiment, the auxiliary boiler 3 is provided as the auxiliary heater, but various auxiliary heaters for heating the heat transfer medium by heater or heat exchange as the auxiliary heater may be employed.

Also, in this embodiment, the control unit 15 controls the flow passage switching mechanism of the exhaust heat recovery unit 1 in accordance with the temperature sensed by the heat transfer medium temperature sensor 13, but the control unit of the flow passage switching mechanism or the heat transfer medium sensor may be provided within the exhaust heat recovery unit 1, to control the flow passage switching mechanism by receiving an operation instruction signal for identifying the cooling operation or heating operation from the control unit 15. Further, in this embodiment, the water is employed as the heat transfer medium or refrigerant, but the heat transfer medium or refrigerant is not limited to the water, but various fluids may be employed.

Also, in this embodiment, the exhaust heat recovery unit 1 having the flow passage switching mechanism is employed as the heat transfer medium temperature adjusting means, but the heat transfer medium temperature adjusting means may be constituted in various ways so far as the temperature of heat transfer medium can be adjusted. For example, the exhaust heat recovery unit is not the heat transfer medium temperature adjusting means, but the heat transfer medium line 7a may be equipped with a device for radiating the heat of heat transfer medium to the atmosphere to adjust the temperature of heat transfer medium.

In this embodiment, the air conditioner with the indoor unit 19 in which the exhaust heat is recovered from the exhaust gas from the engine 21 is exemplified. However, the present invention is not limited to the above embodiment, but may be applied to various air conditioners, for example, air conditioners employing various exhaust heat sources and having various indoor units. As the exhaust heat source, various exhaust heats from the fuel cell, industrial exhaust heat, geothermal sources, or hot spring can be utilized. Moreover, the exhaust heat is not limited to the exhaust gas, but may be recovered from the cooling water for the engine, for example.

With the present invention, the energy saving of the air conditioner can be improved.

In this embodiment, the water is used for the temperature transfer medium such as a refrigerant or a heat transfer medium. The present invention is not limited by this embodiment.

Although the present invention has been shown and described with reference to particular embodiments, various changes and modifications as apparent to those skilled in the art can be made without departing from the true scope and spirit of the invention as defined in the claims.

What is claimed is:

1. An air conditioner comprising:
   heat transfer medium temperature adjusting means for adjusting the temperature of a heat transfer medium;
   an absorption chiller having a heat source defined by said heat transfer medium supplied from said heat transfer medium temperature adjusting means via a heat transfer medium line through which said heat transfer medium conducts;
   a valve provided in said heat transfer medium line;
   a by-pass line branching off from said valve; and
   an indoor unit supplied with one of a refrigerant from said absorption chiller and said heat transfer medium from said heat transfer medium temperature adjusting means via said by-pass line.

2. An air conditioner as claimed in claim 1, wherein when said heat transfer medium passes through said absorption chiller, said heat transfer medium temperature adjusting means stops the heating of said heat transfer medium at the highest temperature in a first temperature range and starts the heating of said heat transfer medium at the lowest temperature, and
   wherein when said heat transfer medium passes through said by-pass line, said heat transfer medium temperature adjusting means stops the heating of said heat transfer medium at the highest temperature in a second temperature range that is lower than the first temperature range for the temperature of said heat transfer medium and starts the heating of said heat transfer medium at the lowest temperature in the second temperature range.

3. An air conditioner as claimed in claim 1, wherein said heat transfer medium temperature adjusting means includes:
   an exhaust heat recovery unit for recovering exhaust heat from an exhaust heat source;
   a temperature sensor for sensing the temperature of said heat transfer medium; and
   a control unit for controlling at least said exhaust heat recovery unit and said temperature sensor.

4. The air conditioner according to claim 3, wherein when said heat transfer medium passes through said absorption chiller, said control unit stops said exhaust heat recovery unit to recover the exhaust heat into said heat transfer medium if said temperature sensor senses the highest temperature in the first temperature range, and the control unit starts said exhausted heat recovery unit to recover the exhaust heat into said heat transfer medium if said temperature sensor senses the lowest temperature, and
   wherein when said heat transfer medium passes through said by-pass line, said control unit stops said exhaust heat recovery unit to recover the exhaust heat into said heat transfer medium if said temperature sensor senses the highest temperature in the second temperature range that is lower than the first temperature range, and the control unit starts said exhaust heat recovery unit to recover the exhaust heat into said heat transfer medium if said temperature sensor senses the lowest temperature in the second temperature range.

5. The air conditioner according to claim 3, wherein said heat transfer medium temperature adjusting means includes:
   an auxiliary heater; and
   an auxiliary control unit for controlling the operation of said auxiliary heater.

6. The air conditioner according to claim 5, wherein when said heat transfer medium passes through said absorption chiller, said auxiliary control unit stops said auxiliary heater to heat said heat transfer medium if said temperature sensor senses the highest temperature in a third temperature range that is lower than the highest temperature in said first temperature range, and said auxiliary control unit starts said auxiliary heater to heat said heat transfer medium if said temperature sensor senses the lowest temperature in the third temperature range, and
   wherein when said heat transfer medium passes through said by-pass line, said auxiliary control unit stops said auxiliary heater to heat said heat transfer medium if said temperature sensor senses the highest temperature in a fourth temperature range that is lower than the highest temperature in said second temperature range, and said auxiliary control unit starts said auxiliary heater to heat said heat transfer medium if said temperature sensor senses the lowest temperature in the fourth temperature range.

7. The air conditioner according to claim 4, wherein said heat transfer medium temperature adjusting means includes:
   an auxiliary heater; and
   an auxiliary control unit for controlling the operation of said auxiliary heater.

8. The air conditioner according to claim 7, wherein when said heat transfer medium passes through said absorption chiller, said auxiliary control unit stops said auxiliary heater to heat said heat transfer medium if said temperature sensor senses the highest temperature in a third temperature range that is lower than the highest temperature in said first temperature range, and said auxiliary control unit starts said auxiliary heater to heat said heat transfer medium if said temperature sensor senses the lowest temperature in the third temperature range, and wherein when said heat transfer medium passes through said by-pass line, said auxiliary control unit stops said auxiliary heater to heat said heat transfer medium if said temperature sensor senses the highest temperature in a fourth temperature range that is lower than the highest temperature in said second temperature range, and said auxiliary control unit starts said auxiliary heater to heat said heat transfer medium if said temperature sensor senses the lowest temperature in the fourth temperature range.

9. The air conditioner according to claim 4, wherein said heat transfer medium temperature adjusting means includes an auxiliary heater.

10. The air conditioner according to claim 9, wherein when said heat transfer medium passes through said absorption chiller, said control unit stops said auxiliary heater to heat said heat transfer medium if said temperature sensor senses the highest temperature in a third temperature range that is lower than the highest temperature in said first temperature range, and said control unit starts said auxiliary heater to heat said heat transfer medium if said temperature sensor senses the lowest temperature in the third temperature range, and wherein when said heat transfer medium passes through said by-pass line, said control unit stops said auxiliary heater to heat said heat transfer medium if said temperature sensor senses the highest temperature in a fourth temperature range that is lower than the highest temperature in said second temperature range, and said control unit starts said auxiliary heater to heat said heat transfer medium if said temperature sensor senses the lowest temperature in the fourth temperature range.

11. The air conditioner according to claim 3, wherein the exhaust heat source is exhaust gas from an engine.

\* \* \* \* \*